United States Patent
Lee et al.

(10) Patent No.: US 7,133,014 B2
(45) Date of Patent: Nov. 7, 2006

(54) APPARATUS AND METHOD FOR DATA TRANSMISSION

(75) Inventors: Seok Woo Lee, Seoul (KR); Jin Kyoung Song, Kyoungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 406 days.

(21) Appl. No.: 10/139,354

(22) Filed: May 7, 2002

(65) Prior Publication Data

US 2003/0132926 A1 Jul. 17, 2003

(30) Foreign Application Priority Data

Jan. 14, 2002 (KR) .................................. 2002-2089

(51) Int. Cl.
G09G 3/36 (2006.01)

(52) U.S. Cl. ........................................ 345/98; 345/211

(58) Field of Classification Search ........ 345/211–215, 345/98–100, 204–208, 87
See application file for complete search history.

(56) References Cited

U.S. PATENT DOCUMENTS

| | | | |
|---|---|---|---|
| 6,118,438 A | 9/2000 | Ho | ............................. 345/204 |
| 6,147,672 A | 11/2000 | Shimamoto | .................. 345/150 |
| 6,236,393 B1 * | 5/2001 | Ogawa et al. | .............. 345/211 |
| 6,320,590 B1 | 11/2001 | Go | |
| 6,323,849 B1 * | 11/2001 | He et al. | ..................... 345/204 |
| 6,611,552 B1 * | 8/2003 | Beck | .......................... 375/219 |
| 2001/0040564 A1 | 11/2001 | Yun et al. | |

FOREIGN PATENT DOCUMENTS

| | | |
|---|---|---|
| DE | 199 15 020 A1 | 10/1999 |
| DE | 199 44 724 A1 | 8/2000 |
| EP | 0 813 134 A2 | 12/1997 |
| EP | 0 903 722 A2 | 3/1999 |
| JP | 2000-152130 | 5/2000 |

* cited by examiner

Primary Examiner—Kent Chang
(74) Attorney, Agent, or Firm—McKenna Long & Aldridge LLP

(57) ABSTRACT

The present invention discloses a data transmission apparatus and method to lower a data transmission voltage for eliminating EMI. In the data driving apparatus, a timing controller aligns input pixel data, lowers input data voltages of the input pixel data, and outputs to a plurality of data transmission lines. A data driver raises the lowered input data voltages for driving the liquid crystal display panel and then converts into analog pixel voltage signals to supply the analog pixel voltage signals to the data lines.

19 Claims, 5 Drawing Sheets

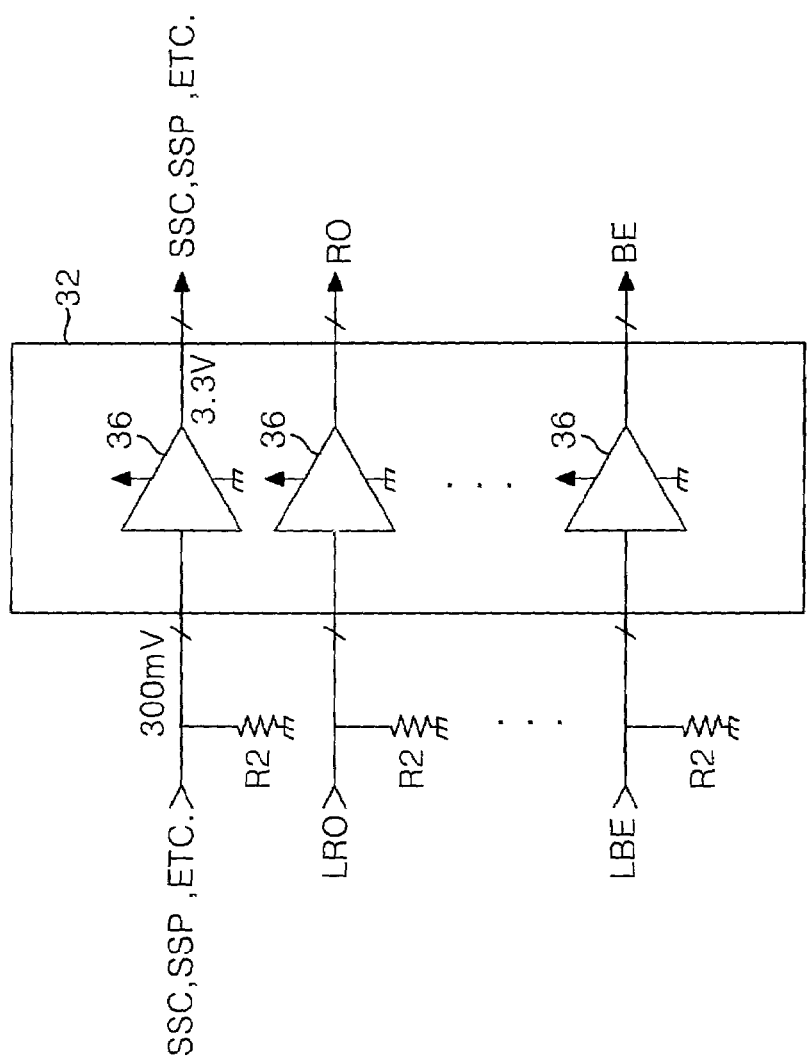

APPARATUS AND METHOD FOR DATA TRANSMISSION

This application claims the benefit of the Korean Application No. P2002-02089 filed on Jan. 14, 2002, which is hereby incorporated by reference.

BACKGROUND OF THE INVENTION

1. Field of the Invention

The present invention relates to a data transmission method, and more particularly, to an apparatus and method for data transmission for minimizing electromagnetic interference (EMI) occurring upon parallel data transmission. Although the present invention is suitable for a wide scope of applications, it is particularly suitable for a data driving apparatus of a liquid crystal display.

2. Discussion of the Related Art

Nowadays, the amount of video data transmitted through a transmission medium has been increased to satisfy a user's demand on a high quality image. As a result, the video data has been transferred at a high speed. In an effort to achieve this end, a transmission frequency of the video data has been increased and the number of transmission lines for transmitting the video data has also been increased. As the video data having a high frequency is transferred synchronously over the increased data transmission lines, electromagnetic interference (EMI) occurs among the data transmission lines.

In order to reduce the EMI, the number of the data transition has been reduced in the liquid crystal display (LCD) by using a data modulation system. Alternatively, the transmission frequency has been reduced by using a six-bus system.

FIG. 1 shows a data driving apparatus of a conventional LCD that transmits video data by using a six-bus system.

Referring to FIG. 1, the data driving apparatus includes data driving IC's 8 for driving data lines of a liquid crystal display panel 10, and a timing controller 2 for controlling a driving of the data driving IC's 8. Each data driving IC 8 is mounted on a tape carrier package (TCP) 6 to be connected to the liquid crystal display panel 10. Further, each data driving IC 8 is connected to a timing controller 2 through the TCP 6 and a printed circuit board (PCB) 4.

More specifically, in the liquid crystal display panel 10, gate lines and data lines are arranged in such a manner to cross each other. Liquid crystal cells are positioned at every area where each gate line cross each data line. The liquid crystal display panel 10 is provided with pixel electrodes and a common electrode for supplying an electric field to each of the liquid crystal cells. Each pixel electrode is connected to one of data lines through source and drain electrodes of a thin film transistor as a switching device. The gate electrode of the thin film transistor is connected to one of the gate lines allowing a pixel voltage signal to be applied to the pixel electrodes for each line. Accordingly, the liquid crystal display panel 10 controls light transmittance by the electric field applied between the pixel electrode and the common electrode in accordance with the pixel voltage signal for each liquid crystal cell, thereby displaying a picture thereon.

The data driving IC's 8 apply a pixel voltage signal to each data line whenever a gate signal is applied to one of the gate lines by gate driving IC's (not shown). Particularly, the data driving IC's 8 convert digital video data (pixel data) inputted from the timing controller 2 into analog pixel voltage signals.

The timing controller 2 controls driving of the data driving IC's 8 and the gate driving IC's and applies the pixel data to the data driving IC's 8 at the same time. To this end, as shown in FIG. 2, the timing controller 2 includes a control signal generator 3 for generating control signals, and a data aligner 5 for aligning the pixel data in conformity to the six-bus system.

The control signal generator 3 generates data control signals (i.e., SSC, SSP, SOE and POL, etc.) for controlling the data driving IC 8 using a main clock signal MCLK and horizontal and vertical synchronizing signals H and V inputted from the exterior thereof. The data control signals are applied to the data driving IC 8 through each transmission line included in a data control signal bus 16. Further, the control signal generator 3 generates and supplies gate control signals (i.e., GSC, GSP and GOE, etc.) for controlling the gate driving IC (not shown) to the gate driving IC through a control signal bus (not shown).

The data aligner 5 aligns pixel data R, G, and B inputted from the exterior thereof in conformity to the six-bus system to supply to the data driving IC 8. In other words, the data aligner 5 divides the pixel data R, G, and B into even-numbered pixel data RO, GO, and BO and even-numbered pixel data RE, GE, and BE to simultaneously supply to the data driving IC 8 through each three odd-numbered data buses 12 and each three even-numbered data buses 14. Herein, when each pixel data RD, GD, and BD consists of a 6-bit signal, each of the odd-numbered data buses 12 and the even-numbered data buses 14 consists of 6 data transmission lines. Thus, the data buses include 36 data transmission lines in total.

The data driving IC of the conventional LCD transmit the pixel data by the six-bus system to reduce the transmission frequency, thereby reducing the EMI. However, the conventional data driving apparatus fails to reduce the EMI because the number of data transmission lines is increased.

SUMMARY OF THE INVENTION

Accordingly, the present invention is directed to an apparatus and method for data transmission that substantially obviates one or more of problems due to limitations and disadvantages of the related art.

Another object of the present invention is to provide an apparatus and method for data transmission that reduces a data transmission voltage to eliminate the EMI.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a data transmission apparatus includes data interfacing means for receiving input data having an input data voltage, lowering the input data voltage, and outputting the lowered input data voltage to a plurality of data transmission lines, and data input means for raising the lowered data voltage back to the input data voltage for driving a liquid crystal display panel.

In the data transmission apparatus, the voltage-divider includes a first resistor arranged in series at each data transmission line, and a second resistor arranged in parallel at each data transmission line and having a resistance value lower than the first resistor.

Herein, the first resistor is arranged at an output terminal of the data interfacing means, and the second resistor is arranged at an input terminal of the data input means.

Alternatively, the first and second resistors are arranged at an output terminal of the data interfacing means.

In another aspect of the present invention, a data transmission method includes lowering an input data voltage of an input data and outputting the lowered input data voltage to a plurality of data transmission lines, and raising the lowered input voltage of the input data back to the input data voltage for driving a liquid crystal display panel.

In another aspect of the present invention, a data driving apparatus of a liquid crystal display for driving a plurality of data lines of a liquid crystal display panel includes a timing controller for aligning input pixel data, for lowering input data voltage of the input pixel data, and for outputting to a plurality of data transmission lines, and a data driver for raising the lowered input data voltages of the pixel data back to the input data voltages for driving the liquid crystal display panel and converting into analog pixel voltage signals to apply the analog pixel voltage signals to the data lines.

In the data driving apparatus, the voltage-divider includes a first resistor arranged in series at each data transmission line, and a second resistor arranged in parallel at each data transmission line and having a resistance value lower than the first resistor.

Herein, the first resistor is arranged at an output terminal of the timing controller, and the second resistor is arranged at an input terminal of the data driver.

Alternatively, the first and second resistors are arranged at an output terminal of the timing controller.

The timing controller generates a plurality of control signals for controlling a driving of the data driver, and lowers voltages of the control signals with the aid of another voltage-divider to output to a plurality of control signal transmission lines.

The voltage-divider includes a first resistor arranged in series at each of the data transmission lines and the control signal transmission lines, and a second resistor arranged in parallel at each of the data transmission lines and the control signal transmission lines and having a resistance value lower than the first resistor.

Herein, the first resistor is arranged at an output terminal of the timing controller, while the second resistor is arranged at an input terminal of the data driver.

Herein, the first resistor is incorporated into the timing controller, and the second resistor is incorporated into the data driver.

Alternatively, the first and second resistors are arranged at an output terminal of the timing controller.

Herein, the first and second resistors are incorporated into the timing controller.

The data driver includes a level shifter array for raising the lowered input data voltages of the input pixel data back to the input data voltages for driving the liquid crystal display panel, and a data driving unit for converting the raised the input data voltages into analog pixel voltage signals to apply the analog pixel voltage signals to the data lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings:

FIG. 5 is a detailed circuit diagram showing a configuration of the level shifter array shown in FIG. 3.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
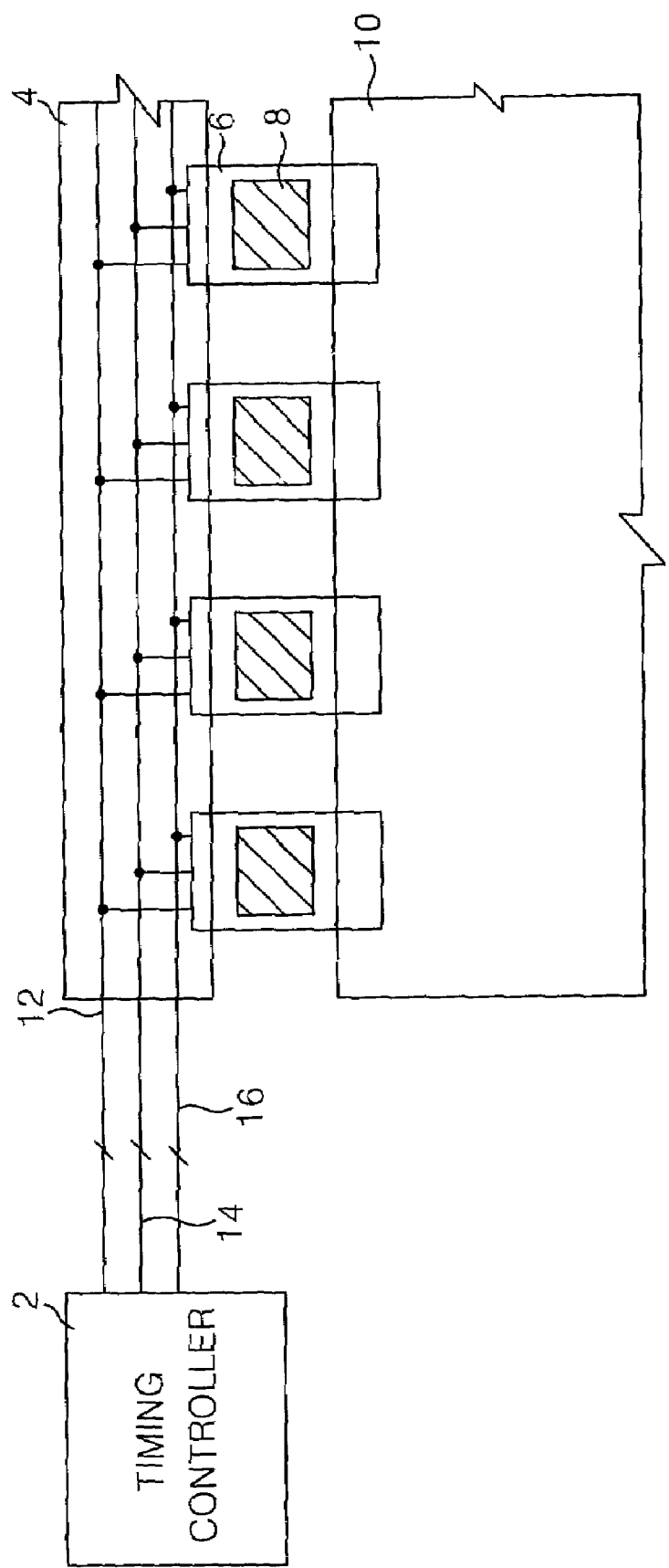
FIG. 1 is a schematic view showing a data driving apparatus of a conventional liquid crystal display.
Figure 2:
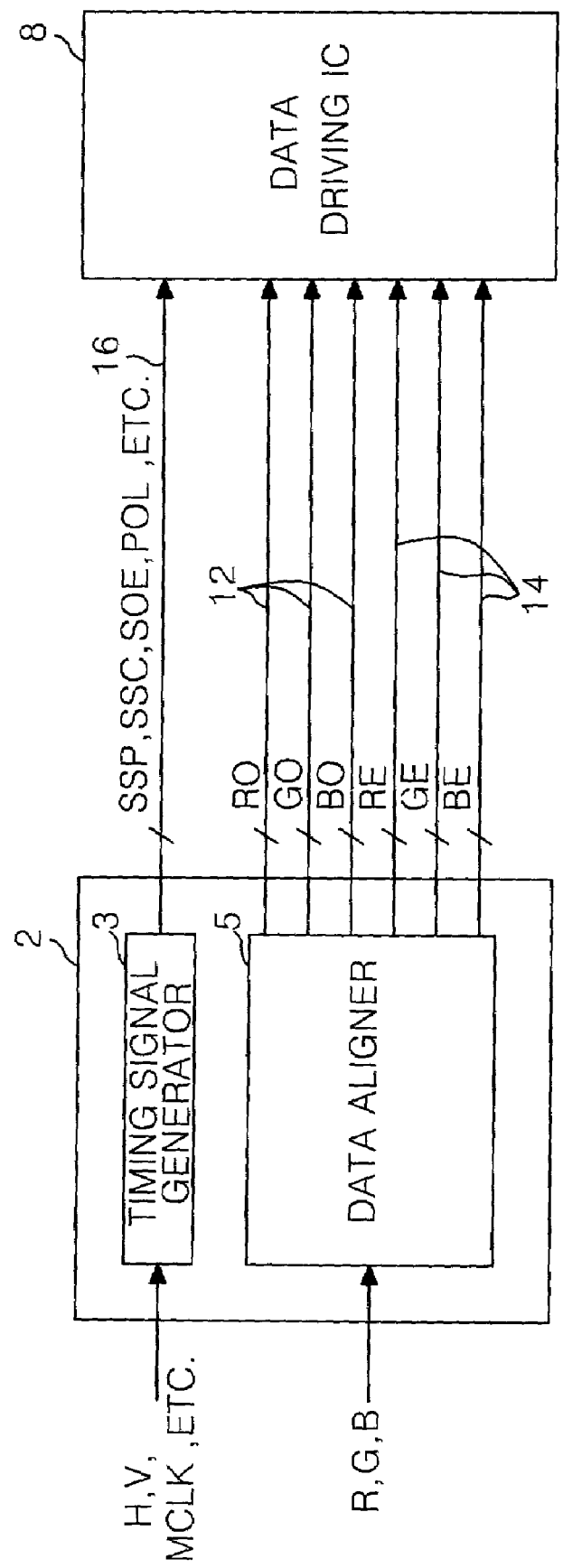
FIG. 2 is a detailed view of data transmission buses between the timing controller and the data driving integrated circuits shown in FIG. 1.
Figure 3:
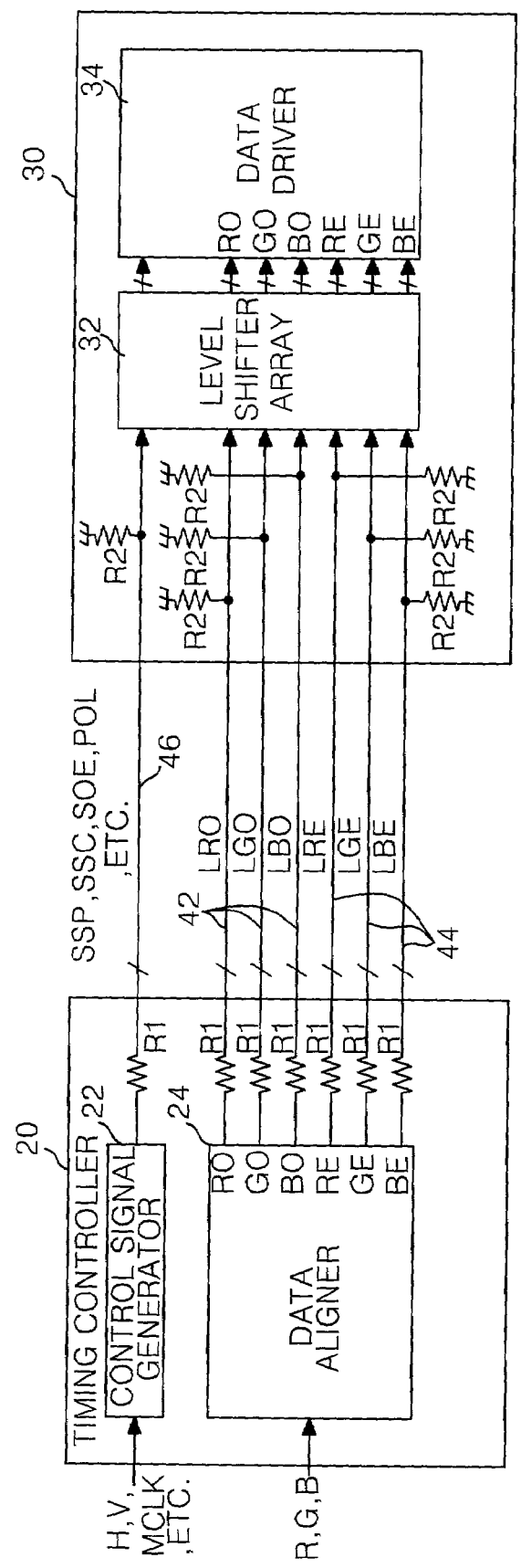
FIG. 3 is a schematic view showing a data driving apparatus of a liquid crystal display according to the present invention.

FIG. 3 is a block diagram showing a configuration of a data driving apparatus of a liquid crystal display according to the present invention.

Referring to FIG. 3, the data driving apparatus includes data driving IC's 30 for driving data lines of a liquid crystal display panel (not shown) and a timing controller 20 for controlling the driving of the data driving IC's 30.

More specifically, the timing controller 20 controls the driving of the data driving IC's 30 and gate driving IC's (not shown) and applies pixel data (i.e., RO, GO, BO, RE, GE, and BE) to the data driving IC's 30 at the same time. To this end, the timing controller 20 includes a control signal generator 22 for generating control signals, and a data aligner 24 for aligning the pixel data RO, GO, BO, RE, GE, and BE in conformity to the six-bus system.

The control signal generator 22 generates data control signals (i.e., SSC, SSP, SOE, and POL, etc.) for controlling the data driving IC 30 using a main clock signal MCLK and horizontal and vertical synchronizing signals H and V inputted from the exterior thereof. The data control signals are applied to the data driving IC 30 through each transmission line included in a data control signal bus 46. Further, the control signal generator 22 generates and supplies gate control signals (i.e., GSC, GSP, and GOE, etc.) for controlling the gate driving IC (not shown) to the gate driving IC through a control signal bus (not shown).

The data aligner 24 aligns pixel data R, G, and B inputted from the exterior thereof in conformity to the six-bus system and supplies to the data driving IC 30. In other words, the data aligner 24 divides the pixel data R, G, and B into even numbered odd-numbered pixel data RO, GO, and BO and even-numbered pixel data RE, GE, and BE and simultaneously supplies to the data driving IC 30 through each three odd-numbered data buses 42 and each three even-numbered data buses 44. Herein, when each pixel data RD, GD, and BD consists of a 6-bit signal, each of the odd-numbered data buses 42 and the even-numbered data buses 44 consists of 6 data transmission lines. Thus, the data buses include 36 data transmission lines in total.

Each data transmission line included in the odd-numbered data buses 42 and the even-numbered data buses 44 is provided with voltage-dividing resistors R1 and R2 to reduce voltages of the pixel data RO, GO, BO, RE, GE, and BE outputted from the timing controller 20. Further, each control signal transmission line included in the data control signal bus 46 is provided with voltage-dividing resistors R1 and R2 to reduce voltages of data control signals outputted from the timing controller 20.

More specifically, a first resistor R1 having a relatively large resistance value is arranged in series at each of the data transmission lines and the control signal transmission lines connected to the output terminal of the timing controller 20. Further, a second resistor R2 having a resistance value lower than the first resistor R1 is arranged in parallel at each of the data transmission lines and the control signal transmission lines connected to the input terminal of the data driving IC 30. Thus, pixel data LRO, LGO, LBO, LRE, LGE, and LBE voltage-dropped in proportion to the resistance value of the first resistor R1 are supplied to the data driving IC 30 through the odd-numbered data buses 42 and the even-numbered data buses 44. Further, data control signals LSSO, LSSC, LSOE and LPOL, etc. voltage-dropped in proportion to the resistance value of the first resistor R1 are supplied to the data driving IC 30 through the data control signal bus 46.

Figure 4:
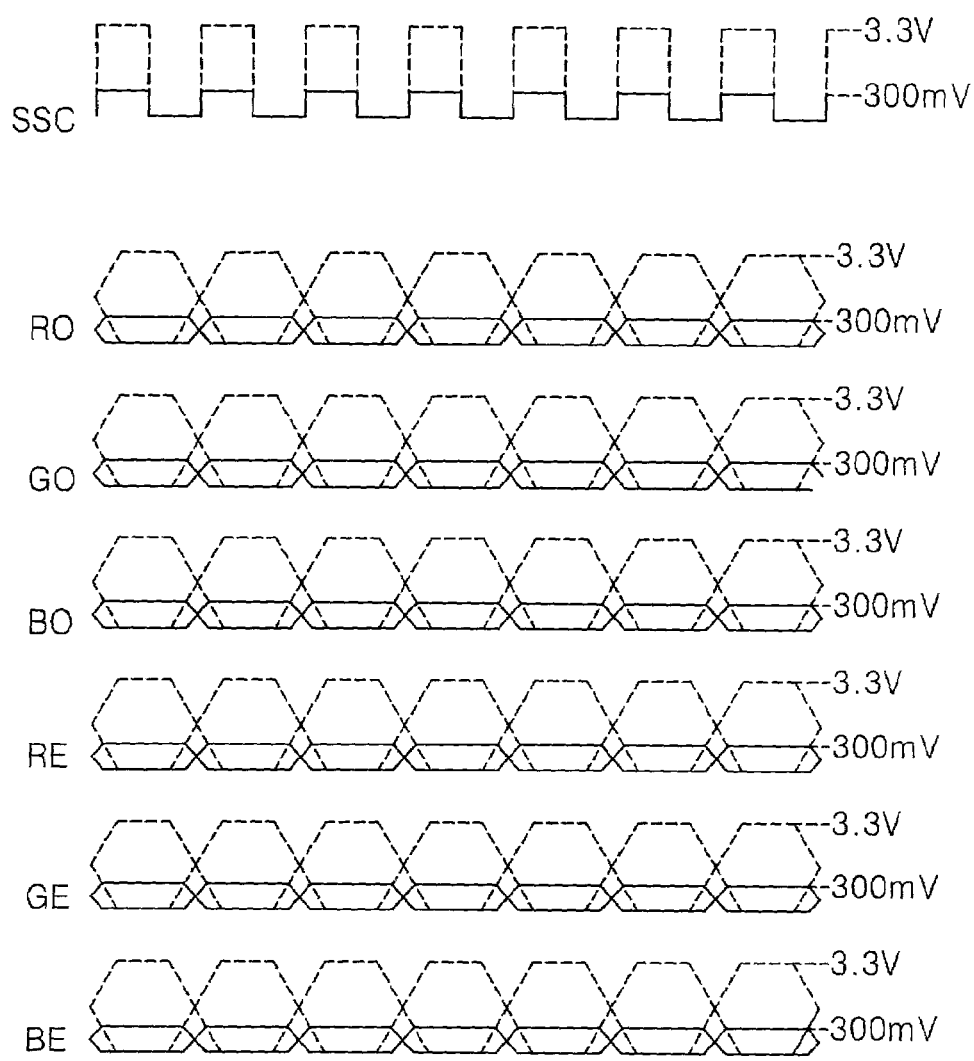
FIG. 4 is a voltage waveform diagram of control signals and pixel data outputted from the timing controller shown in FIG. 3.

For instance, the control signals SSC, SSP, SOE, and POL, etc. outputted from the control signal generator 22 of the timing controller 20 and the pixel data RO, GO, BO, RE, GE, and BE outputted from the data aligner 24 has a swing voltage of about 3.3V as shown in FIG. 4. The source shift clock signal SSC and the pixel data RO, GO, BO, RE, GE, and BE shown in FIG. 4 have a swing voltage of about 300 mV with the aid of the voltage-dividing resistors R1 and R2 arranged at the output terminal of the timing controller 20 and the input terminal of the data driving IC 30, and are transferred through the control signal bus 46 and the data buses 42 and 44. Voltages of the data control signals LSSC, LSSP, LSOE, and LPOL, etc. and the pixel data LRO, LGO, LBO, LRE, LGE, and LBE transferred through the control signal bus 46 and the data buses 42 and 44 are considerably low in comparison to the previously known values, so that the EMI at the buses 42, 44, and 46 is minimized. Herein, the first resistors R1 arranged at the output terminal of the timing controller 20 are integrated along with the timing controller 20. Further, the second resistors R2 arranged at the input terminal of the data driving IC 30 are integrated along with the data driving IC 30. Alternatively, all the voltage-dividing resistors R1 and R2 may be arranged at the output terminal of the timing controller 20 to be integrated along with the timing controller 20.

The data driving IC 30 includes a level shifter array 32 for converting voltages of the voltage-dropped data control signals LSSC, LSSP, LSOE, and LPOL, etc. and the voltage-dropped pixel data LRO, LGO, LBO, LRE, LGE, and LBE, etc. inputted from the timing controller 20 into the normal driving voltage, and a data driver 34 for converting the pixel data RO, GO, BO, RE, GE, and BE into analog pixel voltage signals and supplying them to the data lines.

The level shifter array 32 raises a low voltage level of data control signals LSSC, LSSP, LSOE, and LPOL, etc. inputted through the control signal bus 46 and a low voltage level of pixel data LRO, LGO, LBO, LRE, LGE, and LBE inputted through the data buses 42 and 44 into the normal driving voltages of about 3.3V. The level shifter array 32 then outputs the normal driving voltage level. To this end, the level shifter array 32 includes voltage amplifiers 36 arranged at the data control signal input lines and the pixel data input lines as shown in FIG. 5. The voltage amplifier 36 must have a Schmitt-trigger characteristic capable of generating a sharp rectangular wave signal regardless of the input waveform.

The data driver 34 drives the data lines using the data control signals SSP, SSC, SOE, and POL, etc. and the pixel data RO, GO, BO, RE, GE, and BE raised into the normal driving voltage by means of the level shifter array 32. More specifically, the data driver 34 sequentially latches the pixel data RO, GO, BO, RE, GE, and BE in response to the source start pulse SSP and the source shift clock signal SSC and then simultaneously outputs the latched pixel data in response to the source output enable signal SOE. Subsequently, the data driver 34 converts the simultaneously outputted pixel data RO, GO, BO, RE, GE, and BE into the pixel voltage signals by using gamma voltages to supply the pixel voltage signals to the data lines. In this case, the data driver 34 converts the pixel data into the pixel voltage signals in such a manner to be suitable for a dot inversion driving system or a column inversion driving system in response to the polarity control signal POL.

As described above, the data driving apparatus of the LCD according to the present invention considerably lowers voltage levels of the control signals and the pixel data from the timing controller 20 with the aid of the voltage-dividing resistors to transfer the signals and the data to the data driving IC and then raises them into the normal driving voltage. Thus, the EMI at the data transmission path is minimized and power consumption is much reduced in the present invention.

Moreover, such a technique of lowering the data voltage transferred through the buses with the aid of the voltage-dividing resistors to transfer the lowered data voltage and to raise them back to the normal driving voltage may be easily applicable to a data transmission apparatus providing a parallel data transmission using a multiple bus so as to minimize EMI.

As described above, according to the present invention, the data voltage is considerably lowered with the aid of the voltage-dividing resistors to be transmitted through the buses and then raised back to the normal driving voltage, so that the EMI between the data signals transferred simultaneously through a multiple bus may be minimized. Accordingly, a distortion of the data signals caused by the EMI may be prevented in the present invention.

Furthermore, according to the present invention, voltages of the control signals and the pixel data from the timing controller is considerably lowered with the aid of the voltage-dividing resistors to be transmitted to the data driving IC and then raised back to the normal driving voltage. Thus, it minimizes the EMI at the data transmission path and reduces power consumption.

It will be apparent to those skilled in the art that various modifications and variations can be made in the apparatus and method for data transmission of the present invention without departing from the spirit or scope of the inventions. Thus, it is intended that the present invention covers the modifications and variations of this invention provided they come within the scope of the appended claims and their equivalents.

What is claimed is:

1. A data transmission apparatus, comprising:
   a data interface receiving n-bit parallel input data having an input data voltage, lowering the n-bit parallel input data to a transmission voltage, and outputting the n-bit parallel input data having the transmission voltage to a plurality of data transmission lines, n being a positive integer and the n-bit parallel input data being lowered to the transmission voltage by a first circuit, the first circuit including a first resistor connected in series with each of the data transmission lines; and a data receiver receiving the n-bit parallel input data having the transmission voltage from the data transmission lines, and raising the n-bit parallel input data to the input data voltage for driving a liquid crystal display panel, the n-bit parallel input data being raised to the input data voltage by a second circuit, the second circuit including a voltage amplifier connected to each of the data transmission lines.

2. The data transmission apparatus according to claim 1, wherein the first circuit further includes:
a second resistor arranged in parallel at each of the data transmission lines and having a resistance value lower than the first resistor.

3. The data transmission apparatus according to claim 2, wherein the first resistor is arranged at an output terminal of the data interface, and the second resistor is arranged at an input terminal of the data receiver.

4. The data transmission apparatus according to claim 2, wherein the first and second resistors are arranged at an output terminal of the data interface.

5. A data transmission method comprising:
lowering an input data voltage of an n-bit parallel input data and outputting the n-bit parallel input data having the lowered input data voltage to a plurality of data transmission lines; and
raising the lowered input voltage of the n-bit parallel input data back to the input data voltage for driving a liquid crystal display panel,
wherein the n-bit parallel input data voltage is lowered by a first resistor connected in series with each of the data transmission lines.

6. A data driving apparatus of a liquid crystal display for driving a plurality of data lines of a liquid crystal display panel, the apparatus comprising:
a timing controller for aligning n-bit parallel input pixel data having an input data voltage, for lowering the n-bit parallel input pixel data to a transmission voltage, and for outputting the n-bit parallel input pixel data having the transmission voltage to a plurality of data transmission lines, the timing controller including a first circuit for lowering the n-bit parallel input pixel data to the transmission voltage, the first circuit having a first resistor connected in series with each of the data transmission lines; and
a data driver for raising the n-bit parallel input pixel data back to the input data voltage for driving the liquid crystal display panel and for converting the n-bit parallel input pixel data having the input data voltage into analog pixel voltage signals to apply the analog pixel voltage signals to the data lines, the data driver including a second circuit for the raising the n-bit parallel input pixel data to the input data voltage, the second circuit including a voltage amplifier connected to each of the data transmission lines.

7. The data driving apparatus according to claim 6, wherein the first circuit further includes:
a second resistor arranged in parallel with each of the data transmission lines and having a resistance value lower than the first resistor.

8. The data driving apparatus according to claim 7, wherein the first resistor is arranged at an output terminal of the timing controller, and the second resistor is arranged at an input terminal of the data driver.

9. The data driving apparatus according to claim 7, wherein the first and second resistors are arranged at an output terminal of the timing controller.

10. The data driving apparatus according to claim 6, wherein the timing controller generates a plurality of control signals for controlling driving of the data driver and lowers voltages of the control signals by using a third circuit to output to a plurality of control signal transmission lines.

11. The data driving apparatus according to claim 10, wherein the third circuit includes:
a third resistor arranged in series at each of the control signal transmission lines; and
a fourth resistor arranged in parallel at each of the control signal transmission lines and having a resistance value lower than the third resistor.

12. The data driving apparatus according to claim 11, wherein the third resistor is arranged at an output terminal of the timing controller, and the fourth resistor is arranged at an input terminal of the data driver.

13. The data driving apparatus according to claim 12, wherein the third resistor is incorporated into the timing controller, and the fourth resistor is incorporated into the data driver.

14. The data driving apparatus according to claim 11, wherein the third and fourth resistors are arranged at an output terminal of the timing controller.

15. The data driving apparatus according to claim 14, wherein both the third and fourth resistors are incorporated into the timing controller.

16. The data driving apparatus according to claim 6, wherein the data driver includes:
a data-driving unit for converting the pixel data having the input data voltage into analog pixel voltage signals to supply the analog pixel voltage signals to the data lines.

17. The data transmission apparatus according to claim 1, wherein the input data voltage is at least 10 times as large as the transmission voltage.

18. The data driving apparatus according to claim 6, wherein the input data voltage is at least 10 times as large as the transmission voltage.

19. The data driving apparatus according to claim 6, wherein the timing controller generates a plurality of control signals for controlling driving of the data driver and outputs the control signals to a plurality of control signal transmission lines.

* * * * *